(12) United States Patent
Nishimoto

(10) Patent No.: US 9,891,486 B2
(45) Date of Patent: Feb. 13, 2018

(54) DISPLAY DEVICE

(71) Applicant: Japan Display Inc., Tokyo (JP)

(72) Inventor: Yuuki Nishimoto, Tokyo (JP)

(73) Assignee: Japan Display Inc., Tokyo (JP)

( * ) Notice: Subject to any disclaimer, the term of this patent is extended or adjusted under 35 U.S.C. 154(b) by 29 days.

(21) Appl. No.: 15/087,163

(22) Filed: Mar. 31, 2016

(65) Prior Publication Data
US 2016/0295731 A1 Oct. 6, 2016

(30) Foreign Application Priority Data
Apr. 3, 2015 (JP) .................. 2015-077148

(51) Int. Cl.
*H05K 1/00* (2006.01)
*G02F 1/1345* (2006.01)

(52) U.S. Cl.
CPC .............. *G02F 1/13452* (2013.01)

(58) Field of Classification Search
USPC ........................... 361/749, 736, 748
See application file for complete search history.

(56) References Cited

U.S. PATENT DOCUMENTS

2011/0085771 A1* 4/2011 Matsuyama ............ G02B 6/43
385/125
2013/0148312 A1* 6/2013 Han ..................... H05K 7/00
361/736

FOREIGN PATENT DOCUMENTS

JP 2006-140416 A 6/2006

* cited by examiner

*Primary Examiner* — Andargie M Aychillhum
(74) *Attorney, Agent, or Firm* — Typha IP LLC

(57) ABSTRACT

A display device includes a display panel and a flexible wiring board, an end portion of which is joined to the display panel. The flexible wiring board includes a flexible base substrate in which a through-hole is formed in a position not overlapping the display panel of an extending portion extending from the end portion joined to the display panel in plan view, a first wiring pattern formed to close the through-hole on one surface of the flexible base substrate, and a first resin layer having more flexibility than the flexible base substrate and formed to fill the through-hole formed in the flexible base substrate.

4 Claims, 5 Drawing Sheets

DISPLAY DEVICE

CROSS-REFERENCE TO RELATED APPLICATION

The present application claims priority from Japanese application JP 2015-077148 filed on Apr. 3, 2015, the content of which is hereby incorporated by reference into this application.

BACKGROUND OF THE INVENTION

1. Field of the Invention

The present invention relates to a display device.

2. Description of the. Related Art

It is known to join a flexible printed wiring board to a rigid substrate configuring a display panel or the like and attain electric connection to the outside. It is also possible to mount electronic components on the flexible printed wiring board.

JP 2006-140416 A discloses a flexible printed wiring board in which a slit is provided in a predetermined region near an electronic component mounting portion on the flexible printed wiring board to allow only a flexible portion other than the electronic component mounting portion to bend to thereby make it possible to reduce or eliminate bending stress applied to a solder fillet and prevent disconnection.

A flexible wiring board is connected to various electronic devices and used. For example, when the flexible wiring board is used in a display device, according to demands for a reduction in thickness and a reduction in size in recent years, the flexible e wiring board is sometimes provided to be bent. on the rear side of a display panel connected to the flexible wiring board.

In this way, although the flexible wiring board has flexibility and can be deformed, a joining portion to the display panel is fixed. Therefore, when the flexible wiring board is bent, stress tends to concentrate on a portion of the flexible wiring board overlapping an edge of the display panel.

Since wires in the flexible wiring board are more likely to be disconnected in the portion where the stress concentrates, the inventor considered it necessary to take measures against the disconnection and earnestly examined suppression of the likelihood of the disconnection of the wires in the flexible wiring board.

SUMMARY OF THE INVENTION

It is an object of the present invention to provide a flexible printed wiring board that suppresses likelihood of disconnection of wires in a flexible wiring hoard even when the flexible wiring board is bent.

The object and the new features explained above and other objects and new features of the present invention are made clear by the description of this specification and the accompanying drawings.

A display device according to an embodiment of the present invention includes: a display panel; and a flexible wiring board, an end portion of which is joined to the display panel. The flexible wiring board includes: a flexible base substrate in which a through-hole is formed in a position not overlapping the display panel of an extending portion extending from the end portion joined to the display panel in plan view; a first wiring pattern formed to close the through-hole on one surface of the flexible base substrate; and a first resin layer having more flexibility than the flexible base substrate and formed to fill the through-hole formed in the flexible base substrate.

DETAILED DESCRIPTION OF THE INVENTION

A display device according to an embodiment of the present. invention is explained below with reference to FIGS. 1 to 4.

Figure 1:
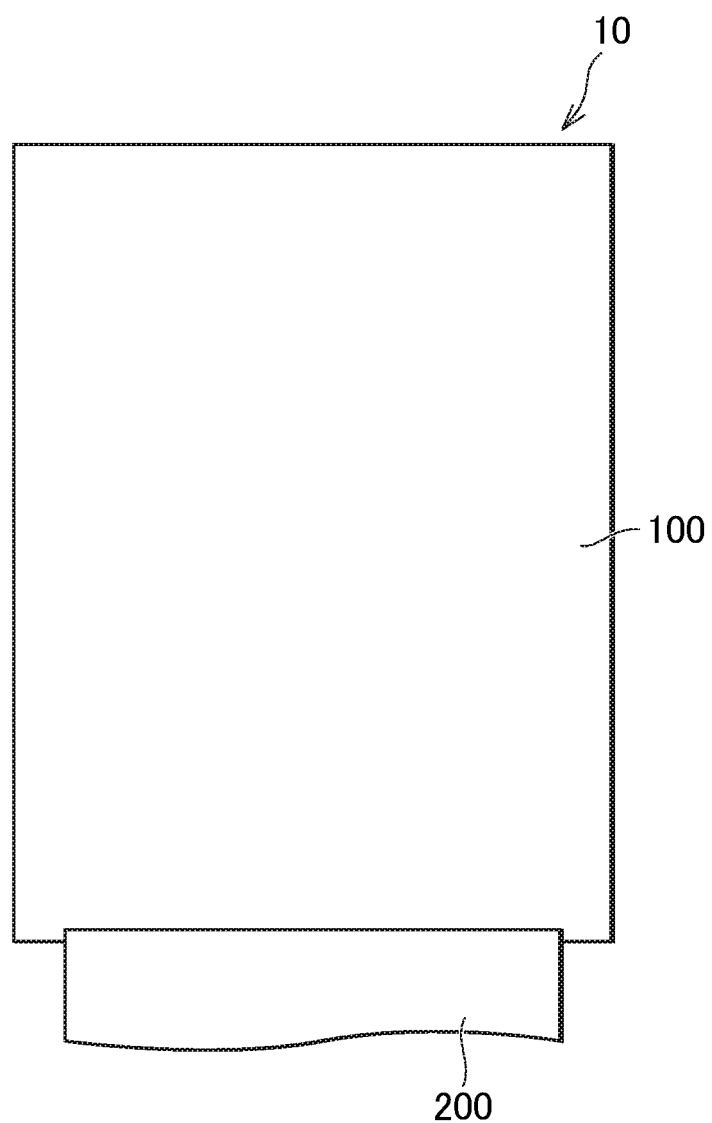
FIG. 1 is a plan view schematically showing a display device according to an embodiment of the present invention.
Figure 2:
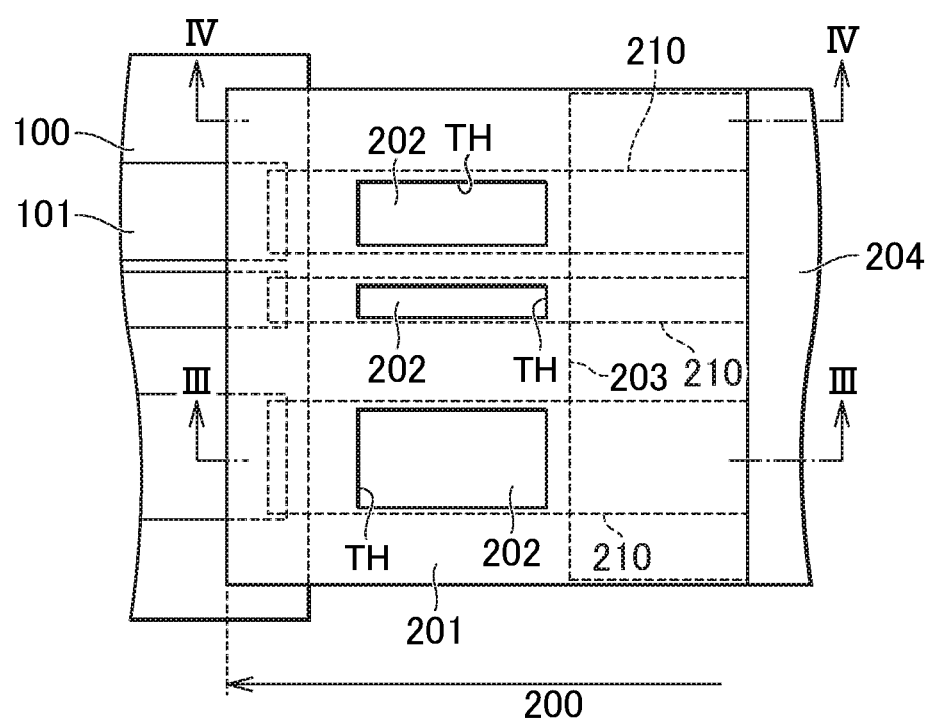
FIG. 2 is an enlarged plan view showing an extending portion extending from an end portion. joined to a display panel of a flexible wiring board configuring a part of the display device according to the embodiment of the present invention.
Figure 3:
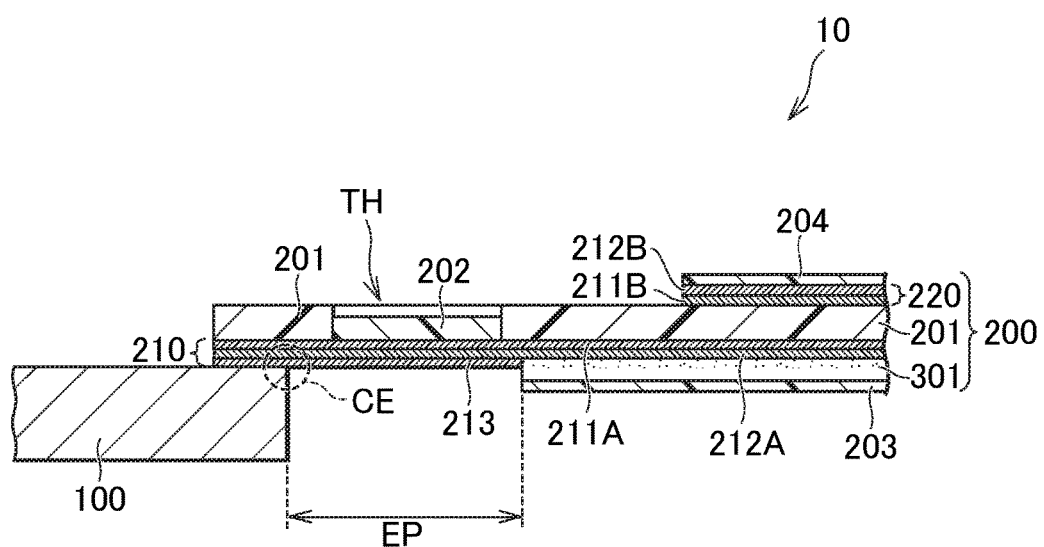
FIG. 3 is a sectional view showing a cross section taken along line III-III of FIG. 2.
Figure 4:
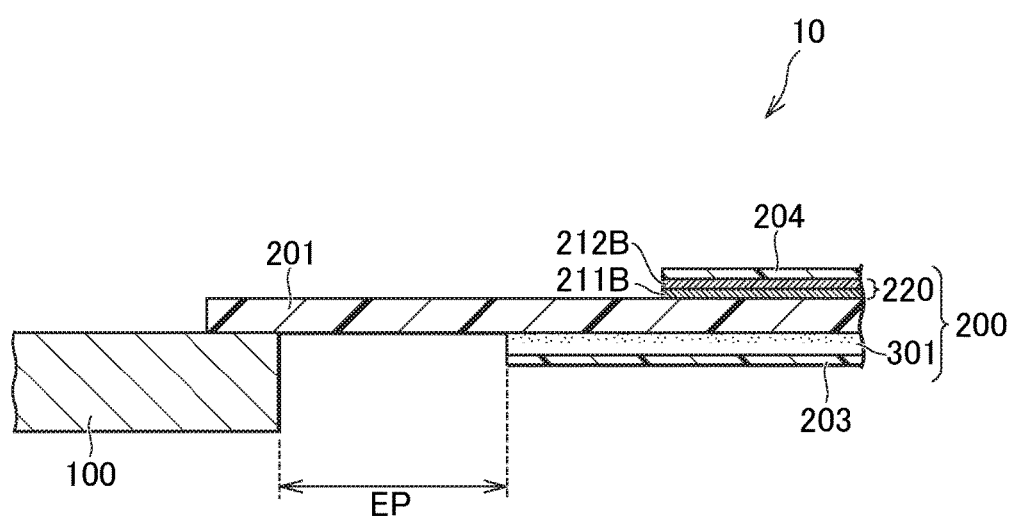
FIG. 4 is a sectional view showing a cross section taken along line IV-IV of FIG. 2.

FIG. 1 is a plan view schematically showing the display device according to the embodiment of the present invention. FIG. 2 is an enlarged plan view showing an extending portion extending from an end portion joined to a display panel of a flexible wiring board configuring a part of the display device according to the embodiment of the present invention. FIG. 3 is a sectional view showing a cross section taken along line III-III of FIG. 2. FIG. 4 is a sectional view showing a cross section taken along line IV-IV of FIG. 2.

As shown in FIG. 1, a display device 10 according to the embodiment of the present invention includes a display panel 100 and a flexible wiring board 200, an end portion of which is joined to the display panel 100.

As shown in FIG. 2, on one surface of the display panel 100, a terminal 101 for electric connection to the flexible wiring board 200 is provided. The flexible wiring board 200 is electrically connected to the terminal 101 of the display panel 100 at the end portion. The flexible wiring board 200 may be connected to an external power supply or the like. In this case, electric power from the external power supply is supplied to the display panel 100 via the flexible wiring board 200.

The display panel 100 included in the display device 10 in this embodiment may be, for example, a liquid crystal display panel or may be an organic EL display panel.

The flexible wiring board 200 included in the display device 10 in this embodiment includes, as shown in FIGS. 1 to 4, a flexible base substrate 201 in which a through-hole TH is formed in a position not overlapping the display panel 100 of an extending portion EP extending from the end portion joined to the display panel 100 in plan view, a first wiring pattern 210 formed to close the through-hole TH on one surface of the flexible base substrate 201, and a first resin layer 202 having more flexibility than the flexible base substrate 201 and formed to fill the through-hole TH formed in the flexible base substrate 201.

The flexible wiring board 200 includes the extending portion EP extending from the end portion joined to the display panel 100. In the display device 10, the flexible wiring board 200 is bent in the extending portion EP and provided to be laid over the display panel 100.

When the extending portion EP of the flexible wiring board 200 is bent to be laid over the rear surface side of the display panel 100, stress tends to concentrate on a connecting end portion (a portion indicated by a sign CE in FIG. 3) overlapping an edge of the display panel 100. Wires are more likely to be disconnected.

If the flexible base substrate in a bending position of the flexible wiring board 200 is removed in order to reduce the stress on the connecting end portion overlapping the edge of the display panel 100, a metal wire directly bends (bends at an acute angle). The wires are more likely to be disconnected in the bending position.

Figure 5:
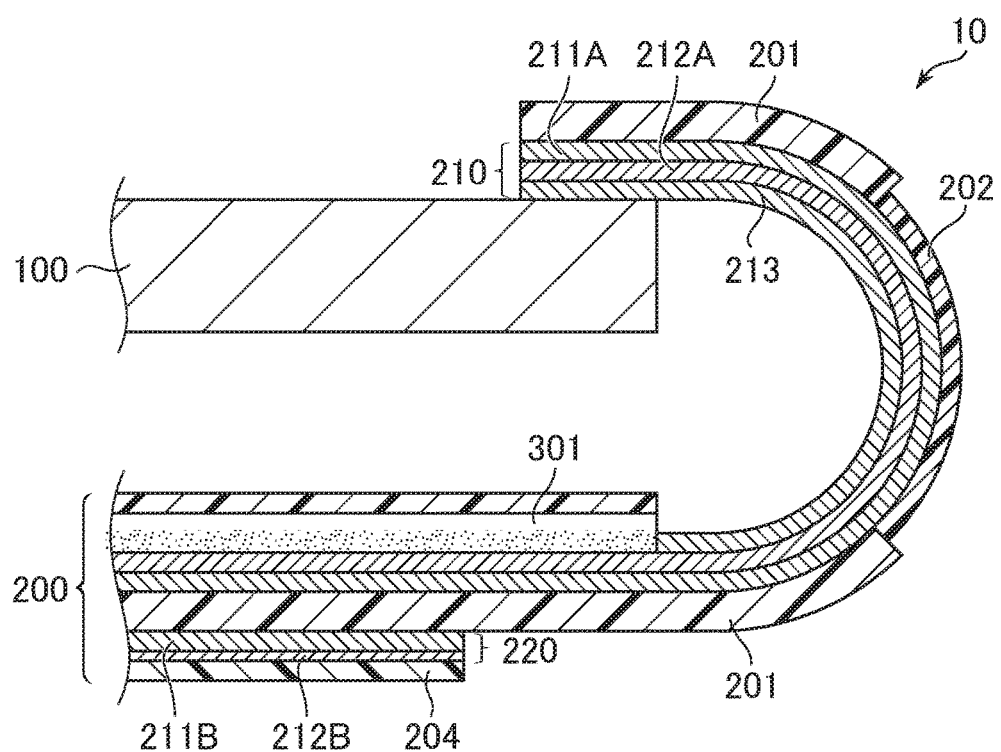
FIG. 5 is a schematic sectional view showing a state in which the flexible wiring board of the display device according to the embodiment is bent.

FIG. 5 is a schematic sectional view showing a state in which the flexible wiring board of the display device according to this embodiment is bent. In the display device 10 according to this embodiment, the first resin layer 202 formed to cover a part of the first wiring pattern 210 is provided. Consequently, the stress at the connecting end portion CE overlapping the edge of the display panel 100 is reduced. The direct bending (the bending at the acute angle) of the metal wire in the bending position of the flexible wiring board 200 is suppressed. The likelihood of the disconnection of the wires is reduced.

Members configuring the display device 10 according to this embodiment are explained in detail below.

The flexible base substrate 201 configuring the display device 10 according to this embodiment is excellent in flexibility and has elasticity. The flexible base substrate 201 may be formed of, for example, polyimide or polyethylene terephthalate (PET) The thickness of the flexible base substrate 201 may be set to, for example, 0.1 mm or less or may be set to 0.05 mm or less.

In the flexible base substrate 201, the through-hole TH is formed to partially overlap the position where the first wiring pattern 210 is formed. The position where the through-hole TH is formed is desirably a position that easily bends when the flexible wiring board 200 is bent.

The first wiring pattern 210 provided on one surface of the flexible base substrate 201 may be formed of metal, may be formed of, for example, a conductor foil, and more specifically formed of a copper foil. The thickness of a copper foil layer 211A. configuring the first wiring pattern 210 may be set to, for example, 0.05 mm or less or may be set to 0.03 mm or less.

In the first wiring pattern 210 in this embodiment, as shown in FIG. 3, a copper plating layer 212A is formed on the surface of the copper foil layer 211A and a gold plating layer 213 is formed on the surface of the copper plating layer 212A. In this way, the first wiring pattern. 210 may be formed by a plurality of metal layers. Desired electric conductivity can be obtained by stacking the plurality of metal layers.

As explained above, the end portion of the first wiring pattern 210 is electrically connected to the display panel 100. For example, electric power may be supplied to the display panel 100 from the outside. In this case, the first wiring pattern 210 functions as a power supply line. Therefore, in general, compared with a wire such as a signal line, a wide wire is formed.

When the first wiring pattern 210 is configured by the relatively wide wire for power supply, flexibility of metal forming the wire is inferior to the flexibility of the resin forming the flexible base substrate 201. Therefore, a region where the first wiring pattern 210 is provided is inferior in flexibility compared with a region where the first wiring pattern 210 is not provided.

In the flexible wiring board 200 configuring the display device 10 in this embodiment, the first resin layer 202 formed of resin having more flexibility than the flexible base substrate 201 is provided in a position where the first wiring pattern 210 is disposed.

Since the first resin layer 202 is provided, overall flexibility of the flexible wiring board 200 is improved. The stress in the portion overlapping the edge of the display panel 100 is reduced. The first wiring pattern 210 smoothly bends to follow a shape of the bending of the first resin layer 202. Therefore, it is possible to avoid disconnection in the bending position.

As shown in FIG. 2, the first wiring pattern 210 included in the display device 10 in this embodiment is formed to overlap an entire region where the through-hole TH of the flexible base substrate 201 is formed. The first resin layer 202 is provided to fill a recessed portion surrounded by the inner side surface of the through-hole TH and the first wiring pattern 210. In this way, the first resin layer 202 is desirably provided in direct contact with the first wiring pattern 210.

The first resin layer 202 may be formed by, for example, applying liquid resist (liquid solder resist) to the recessed portion surrounded by the inner side surface of the through-hole TH and the first wiring pattern 210 and thereafter hardening the liquid resist. More specifically, the first resin layer 202 may be formed by applying the liquid resist (the liquid solder resist) to the recessed portion surrounded by the inner side surface of the through-hole TH and the first wiring pattern 210 with a screen printing method, a spray method, or a curtain coat method.

As shown in FIG. 3, the thickness of the first resin layer 202 may be set smaller than the thickness of the flexible base substrate 201. This is because the first resin layer 202 is desirably as thin as possible in order to improve the flexibility of the flexible wiring board 200. In this way, the effect of the present invention is further improved by setting the thickness of the first resin layer 202 smaller than the thickness of the flexible base substrate 201.

The bending radius of the bending position can be reduced by setting the thickness of the first resin layer 202 smaller than the thickness of the flexible base substrate 201. This makes it easy to meet the demands for a reduction in the thickness and a reduction in the size of the display panel.

The flexible wiring board 200 may further include a coating layer 203 covering a part of the first wiring pattern 210 and provided in a position avoiding the region where the through-hole TH is formed in plan view.

The coating layer 203 protects the surface of the flexible wiring board 200 from heat, dust, and the like on the outside. The coating layer 203 is desirably formed of a material excellent in bendability, flexibility, solder heat resistance, and dimension stability or formed of as thin a layer as possible.

The coating layer 203 may be formed of, for example, polyimide, polyethylene terephthalate (PET), or polyacrylate-based liquid crystal polymer (LCP). The thickness of the coating layer 203 may be set to, for example, 0.1 mm or less or may be set to 0.05 mm or less.

As shown in FIGS. 3 and 4, the coating layer 203 may cover a part of the first wiring pattern 210 via an adhesive layer 301. The coating layer 203 may be provided in a position avoiding the region where the through-hole TH is formed. in plan view. In this case, the adhesive layer 301 may be formed using an epoxy-based, acryl-based, polyester-based, or imide-based adhesive or the like. The thickness of the adhesive layer 301 may be set to, for example, 0.1 mm or less or may be set to 0.05 mm or less.

The flexible wiring board 200 may further include a second wiring pattern 220 formed on the other surface different from one surface on which the first wiring pattern 210 of the flexible base substrate 201 is formed while avoiding the region where the through-hole TH is formed in plan view. The second wiring pattern 220 may be covered with a second resin layer 204 provided apart from the first resin layer 202 in plan view.

The second wiring pattern 220 may be formed of metal and may be formed of, for example, a conductor foil. More specifically, the second wiring pattern 220 may be formed of a copper foil. The thickness of a copper foil layer 211B configuring the second wiring pattern 220 may be set to, for example, 0.05 mm or less or may be set to 0.03 mm or less.

In the second wiring pattern 220 in this embodiment, as shown in FIGS. 3 and 4, a copper plating layer 212B is formed on the surface of the copper foil layer 211B. In this way, the second wiring pattern 220 may be formed of a plurality of layers.

The second resin layer 204 formed to cover the second wiring pattern 220 may be formed of resin. having more flexibility than the flexible base substrate 201. Since the second resin layer 204 is formed of the resin having more flexibility than the flexible base substrate 201, it is possible to suppress a decrease in the flexibility of the flexible wiring board 200. As a result, the effect of the present invention is attained. The first resin layer 202 and the second resin layer 204 may be formed of the same material.

The second resin layer 204 is provided apart from the first resin layer 202. By providing a gap between the second resin layer 204 and the first resin layer 202 in this way, when the flexible wiring board 200 is bent, the stress in the portion overlapping the edge of the display panel 100 is reduced and the likelihood of disconnection of the wires is suppressed.

As shown in FIGS. 3 and 4, the second resin layer 204 included in the display device 10 in this embodiment may be provided in direct contact with the second wiring pattern 220. The second resin layer 204 may be formed by, for example, directly applying liquid resist (liquid solder resist) on the second wiring pattern 220 and thereafter hardening the liquid resist. More specifically, the second resin layer 204 may be formed by applying the liquid resist (the liquid, solder resist) on the second wiring pattern 220 with the screen printing method, the spray method, or the curtain coat method.

When the first resin layer 202 and the second resin layer 204 are formed of the same material, the first resin layer 202 and the second resin layer 204 may be formed in the same process or at the same timing.

The thickness of the second resin layer 204 may be set smaller than the thickness of the flexible base substrate 201. This is because the second resin layer 204 is desirably as thin as possible in order to improve the flexibility of the flexible wiring board 200. In this way, the effect of the present invention is further improved by setting the thickness of the second resin layer 204 smaller than the thickness of the flexible base substrate 201.

While there have, been described what are at present considered to be certain embodiments of the invention, it will be understood that various modifications may be made thereto, and it is intended that the appended claims cover all such modifications as fall within the true spirit and scope of the invention.

What is claimed is:

1. A display device comprising: a display panel; and a flexible wiring board, an end portion of which is joined to the display panel, wherein the flexible wiring board includes: a flexible base substrate in which a through-hole is formed in a position not overlapping the display panel of an extending portion extending from the end portion joined to the display panel in plan view; a first wiring pattern formed to close the through-hole on one surface of the flexible base substrate; and a first resin layer having more flexibility than the flexible base substrate and formed to fill the through-hole formed in the flexible base substrate, wherein the flexible wiring board further includes a coating layer covering a part of the first wiring pattern and provided in a position avoiding a region where the through-hole is formed in plan view.

2. The display device according to claim 1, wherein the flexible wiring board further includes a second wiring pattern formed on another surface of the flexible base substrate while avoiding a region where the through-hole is formed in plan view, and the second wiring pattern is covered with a second resin layer provided apart from the first resin layer in plan view.

3. The display device according to claim 2, wherein the first resin layer and the second resin layer are formed of a same material.

4. The display device according to claim 1, wherein the first resin layer is provided in contact with the first wiring pattern.

* * * * *